United States Patent Office 3,518,490
Patented June 30, 1970

3,518,490
CONTROL NETWORK FOR AN ELECTRICAL SYSTEM HAVING MULTIPLE POWER SUPPLIES
Harry Bell Wattson, Rutherford, N.J., assignor to The Bendix Corporation, a corporation of Delaware
Filed Mar. 8, 1967, Ser. No. 622,871
Int. Cl. H02h 3/38, 7/14
U.S. Cl. 317—31         3 Claims

ABSTRACT OF THE DISCLOSURE

A network for controlling power to a system having multiple positive and negative power supplies and including an arrangement of semiconductors responsive to high and low voltage and current malfunctions in the power supplies to turn off all power to the system when a malfunction occurs in one power supply. The device is, also responsive to predetermined external or internal operating abnormalities for turning off all power to the system. Power to the system remains off until the system is reset.

CROSS REFERENCE TO RELATED APPLICATIONS

The control network of the present invention may be used in conjunction with apparatus for converting an alternating current supply voltage into a direct current output such as that disclosed and claimed in copending U.S. application Ser. No. 602,024, filed Dec. 15, 1966, by Harry Bell Wattson and assigned to The Bendix Corporation, assignee of the present invention.

BACKGROUND OF THE INVENTION

Field of the invention

This invention relates to control networks for electrical systems and more particularly to a network for controlling power to an electrical system so as to prevent erroneous system outputs and component damage.

Description of prior art

The need for a control network of the type described comes from the fact that in flight control systems or other servo systems having multiple positive and negative power supplies, if one power supply develops a malfunction all other power supplies to the system, both positive and negative, must be turned off so as to prevent erroneous system outputs. Also, in most systems, if the negative supply develops a malfunction and the positive supply is left on, damage may result to the components in the system. It is further desirable to deactivate the system when any external or internal operating abnormality such as high or low temperature occurs.

Heretofore devices for controlling power to an electrical system have been primarily current limiting devices applicable to a single power supply and employing electromechanical means such as relays having slow response and poor reliability. Complete protection for systems having multiple power supplies has only been provided by sacrificing valuable weight and space.

SUMMARY OF THE INVENTION

Each power supply in the system is regulated by a silicon controlled rectifier. The firing of the silicon controlled rectifiers is controlled by a first transistor through a controlling device so that when the first transistor is conductive full power is obtained from the power supply and when said transistor is nonconductive no power is obtained. The first transistor is controlled by another silicon controlled rectifier in response to high voltage or current outputs from the positive supply and a second transistor controls the other silicon controlled rectifier in response to high voltage or current outputs from the negative supply. The other silicon controlled rectifier and the second transistor are also controlled by positive and negative outputs respectively, corresponding to predetermined operating abnormalities.

In order to control power to the system in response to low voltage or low current an additional transistor is required for each power supply. The additional transistor for the positive power supply controls the other silicon controlled rectifier and the additional transistor for the negative power supply controls the second transistor so that if either the output voltage or current from either power supply is below a predetermined limit all power to the system is turned off.

A capacitor is arranged in the network so that when power is turned off for any of the aforenoted malfunctions it will remain off until the capacitor is shorted by closing a switch.

One object of this invention is to provide a control network for an electrical system, and which control network has high reliability and reduced weight and size for instantaneously controlling power to the system so as to prevent erroneous system outputs and component damage.

Another object of this invention is to provide a control network of the type described above and which is responsive to high or low voltage or current malfunctions in multiple positive or negative power supplies for turning all of said power supplies off when a malfunction occurs in one of them.

Another object of this invention is to turn off power to the system in response to a predetermined external or internal operating abnormality.

Another object of this invention is to maintain system power off, once it is turned off for any of the aforenoted malfunctions, and to provide means for resetting the system to return power thereto.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

DESCRIPTION OF THE DRAWINGS

FIG. 4 is a graphical representation showing the waveform of an alternating supply voltage for the electrical system.

FIG. 5 is a graphical representation showing the waveform of the supply voltage rectified to provide a direct current input to the system.

FIG. 6 is a graphical representation showing the waveform of an alternating energizing voltage to the system.

FIG. 7 is a graphical representation showing the waveform of a controlled direct current input to the system.

With reference to FIG. 1, there is provided a suitable source of alternating current designated by the numeral 2 and having an output conductor 4 and a grounded output conductor 6. The alternating current source 2 provides across the conductors 4 and 6 an alternating current output which, for example, may be a 110 volt 400 cycle alternating voltage having a waveform as shown in the graphical representation of FIG. 4 and such as may be used in an electrical control system.

Figure 1:
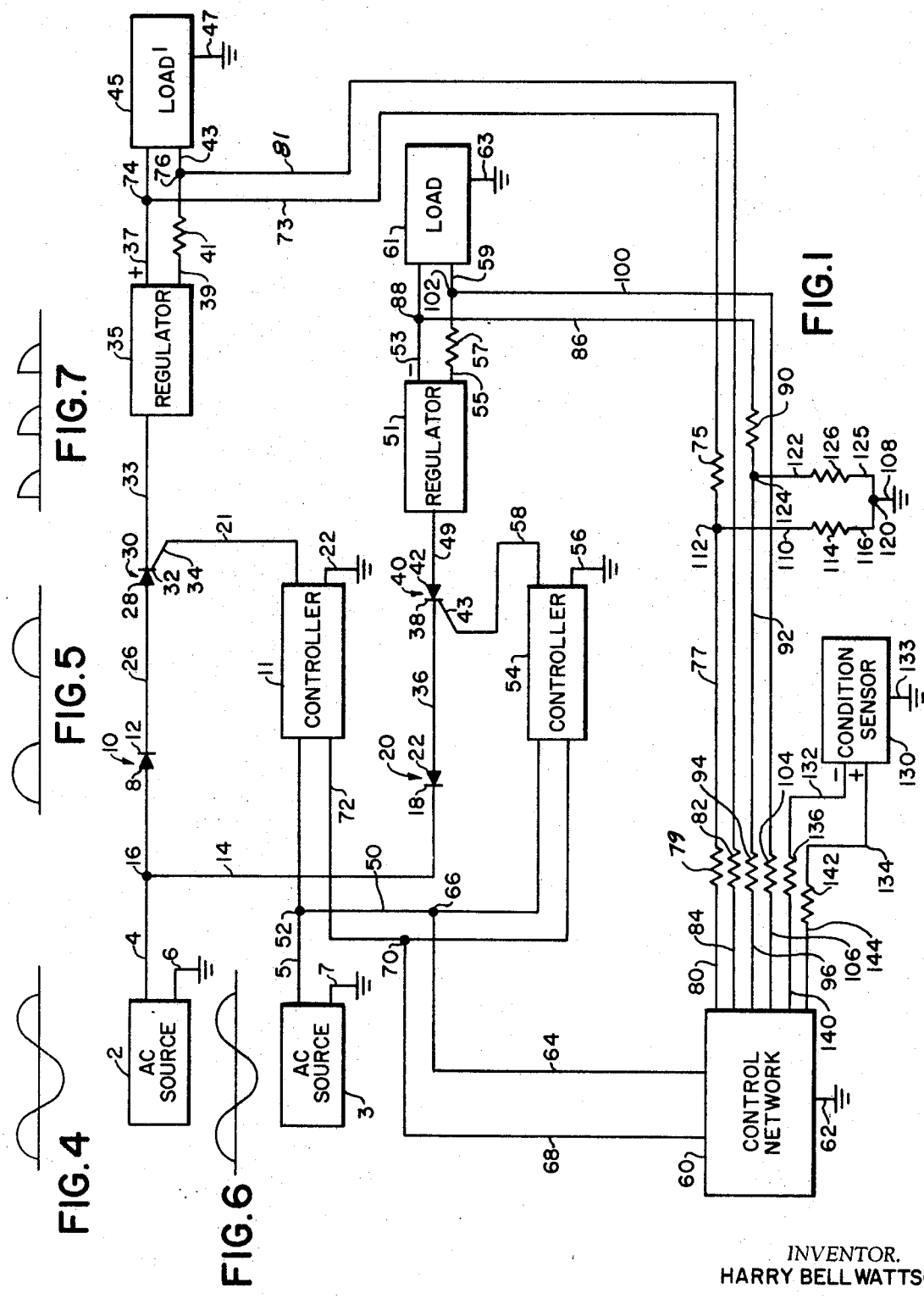
FIG. 1 is an electrical schematic diagram showing an electrical system including generally the control network of the present invention.

The alternating current from the alternating current source 2 is applied through the output conductor 4 to an anode 8 of a diode 10. The diode 10 has a cathode 12 at which there is provided a rectified output in a positive sense and having a waveform as shown in the graphical representation of FIG. 5. The alternating current output is applied through the output conductor 4 and a conductor 14 joining the output conductor 4 at a point 16 to a cathode 18 of a diode 20. The diode 20 has an anode 22 at which there is provided a rectified output in a negative sense but otherwise similar to the output shown in the graphical representation of FIG. 5.

The cathode 12 of the diode 10 is connected through a conductor 26 to an anode 28 of a silicon controlled rectifier 30, which silicon controlled rectifier 30 has a cathode 32 and a gate 34. The anode 22 of the diode 20 is connected through a conductor 36 to a cathode 38 of a silicon controlled rectifier 40, which silicon controlled rectifier 40 has an anode 42 and a gate 43.

A suitable source of alternating current designated by the numeral 3 and having an output conductor 5 and a grounded output conductor 7 provides across the conductors 5 and 7 an alternating current output which may for example be a 26 volt 400 cycle alternating voltage having a waveform as shown in the graphical representation of FIG. 6, and which output is in phase with the alternating current output across the output conductors 4 and 6 of the alternating current source 2 as may be seen by comparing FIGS. 4 and 6.

The alternating current output from the alternating current source 3 is applied through the conductor 5 to a controller 11, which controller 11 provides a controlling output across the output conductors 21 and 22 thereof, and which controlling output is applied through the conductor 21 to the gate 34 of the silicon controlled rectifier 30 so as to control the conduction of the silicon controlled rectifier 30 whereby there is provided at the cathode 32 thereof an output in a positive sense and having a waveform as shown in the graphical representation of FIG. 7.

The controller 11 may be a device such as disclosed and claimed in the aforenoted copending U.S. application Ser. No. 602,024, and controls the conduction of the silicon controlled rectifier 30 so as to provide the output shown in FIG. 7, as explained in the aforenoted copending U.S. application Ser. No. 602,024.

The alternating current output from the alternating current source 3 is applied through a conductor 50 joining the output conductor 5 at a point 52 to a controller 54 which controller 54 is similar to the controller 11 and provides a controlling output across output conductors 56 and 58 thereof for controlling the gate 43 and thereby the conduction of the silicon controlled rectifier 40, whereby there is provided at the anode 42 of the silicon controlled rectifier 40 an output in a negative sense, but otherwise similar to the output shown in the graphical representation of FIG. 7.

A control network 60 having a grounded input-output conductor 62 is shown generally in FIG. 1 and is connected intermediate the alternating current source 3 and the controllers 11 and 54 through a conductor 64 which joins at a point 66 the conductor 50 leading from the point 52 on the output conductor 5 of the alternating current source 3, and through a conductor 68 which joins at a point 70 a conductor 72 connecting the controllers 11 and 54.

The cathode 32 of the silicon controlled rectifier 30 is connected through a conductor 33 to a regulator 35. The regulator 35 is responsive to the output at the cathode 32 of the silicon controlled rectifier 30, which output has a waveform as shown in FIG. 7, for providing across output conductors 37 and 39 thereof a constant positive direct current output. A load 45 having a grounded input-output conductor 47 is connected to the conductor 37 and is connected to the conductor 39 through a sensing resistor 41 and a conductor 43 so as to be driven by the constant positive direct current output across the conductors 37 and 39.

The anode 42 of the silicon controlled rectifier 40 is connected through a conductor 49 to a regulator 51. The regulator 51 is responsive to the output at the anode 42 of the silicon controlled rectifier 40, which output is in a sense opposite, but otherwise similar to the output shown in FIG. 7, for providing across output conductors 53 and 55 thereof a constant negative direct current output. A load 61 having a grounded input-output conductor 63 is connected to the conductor 53 and is connected to the conductor 55 through a sensing resistor 57 and a conductor 59 so as to be driven by the constant negative direct current output across the conductors 53 and 55.

The control network 60 connected intermediate the alternating current source 3 and the controller 11 and 54, as heretofore noted, is energized by the output from the alternating current source 3 applied through the conductor 64 and is responsive to the outputs from the regulator 35 and the regulator 51 for providing a controlling output at the output conductor 68 of the control network 60. The controlling output at the output conductor 68 effectively controls the controllers 11 and 54 through the connecting conductor 72 so that the silicon controlled rectifiers 30 and 40, which in turn are controlled by the controllers 11 and 54, are ineffective for conducting the alternating current supply voltage from the alternating current source 2, thus shutting off power to the system when the regulators 35 and 51 mulfunction so as to provide high or low voltage or current outputs, as will be hereinafter explained.

The output from the regulator 35 is applied to the control circuit 60 through a conductor 73 joining the output conductor 37 at a point 74, a resistor 75, a conductor 77, a resistor 79 and a conductor 80, and through a conductor 81 joining at a point 76 the conductor 43 leading from the sensing resistor 41, a resistor 82 and a conductor 84.

The output from the regulator 51 is applied to the control circuit 60 through a conductor 86 joining the output conductor 53 at a point 88, a resistor 90, a conductor 92, a resistor 94 and a conductor 96, and through a conductor 100 joining at a point 102 the conductor 59 leading from the sensing resistor 57, a resistor 104 and a conductor 106.

The conductor 77 and the conductor 92 are connected through conductors 110 and 122, respectively, joining the conductors 77 and 92 at points 112 and 124 to a voltage divider including a resistor 114 and a resistor 126. The resistor 114 is connected to a grounded conductor 108 through a conductor 116 joining the grounded conductor 108 at a point 120 and the resistor 126 is connected to the grounded conductor 108 through a conductor 128 joining the grounded conductor 108 at the point 120.

In addition, the control network 60 is responsive to negative and positive outputs at output conductors 132 and 134, respectively, of a condition sensor 130 having a grounded input-output conductor 133 for providing at the output conductor 68 of the control network 60 the controlling output for controlling the controllers 11 and 54. The condition sensor 130 may be of the type for sensing a predetermined internal or external operating condition which, by way of example, may be high and low operating temperature, and for providing negative and positive outputs at the conductors 132 and 134 corresponding to the sensed condition.

The negative output at the output conductor 132 is applied to the control network 60 through the conductor 132, a resistor 136 and a conductor 140, and the positive output at the output conductor 134 is applied to the control network 60 through the conductor 134, a resistor 142 and a conductor 144.

HIGH VOLTAGE AND CURRENT CONTROL

Figure 2:
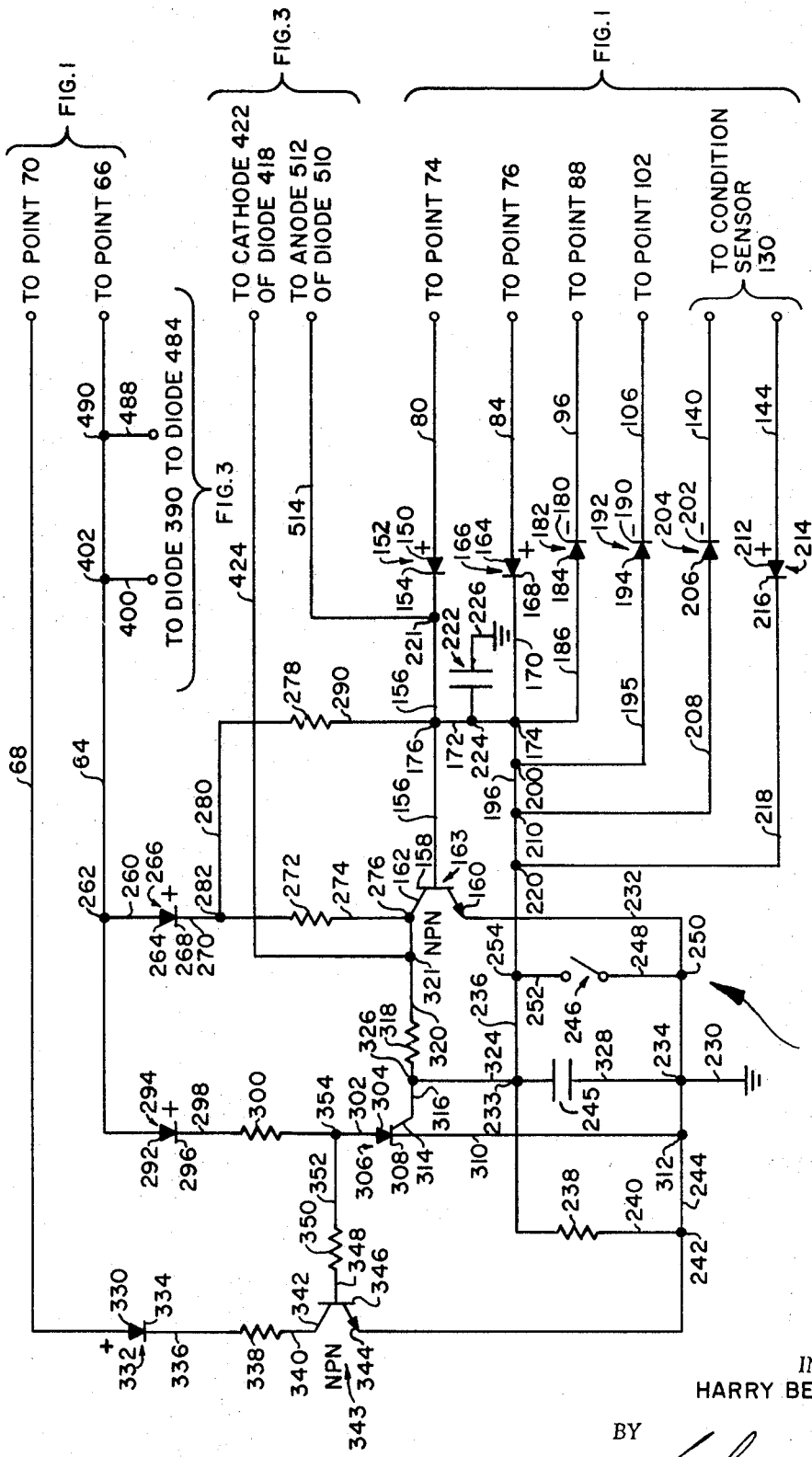
FIG. 2 is an electrical schematic diagram of a part of the control network 60 of FIG. 1, showing a high current and voltage and operating abnormality control system embodying the present invention.
Figure 3:
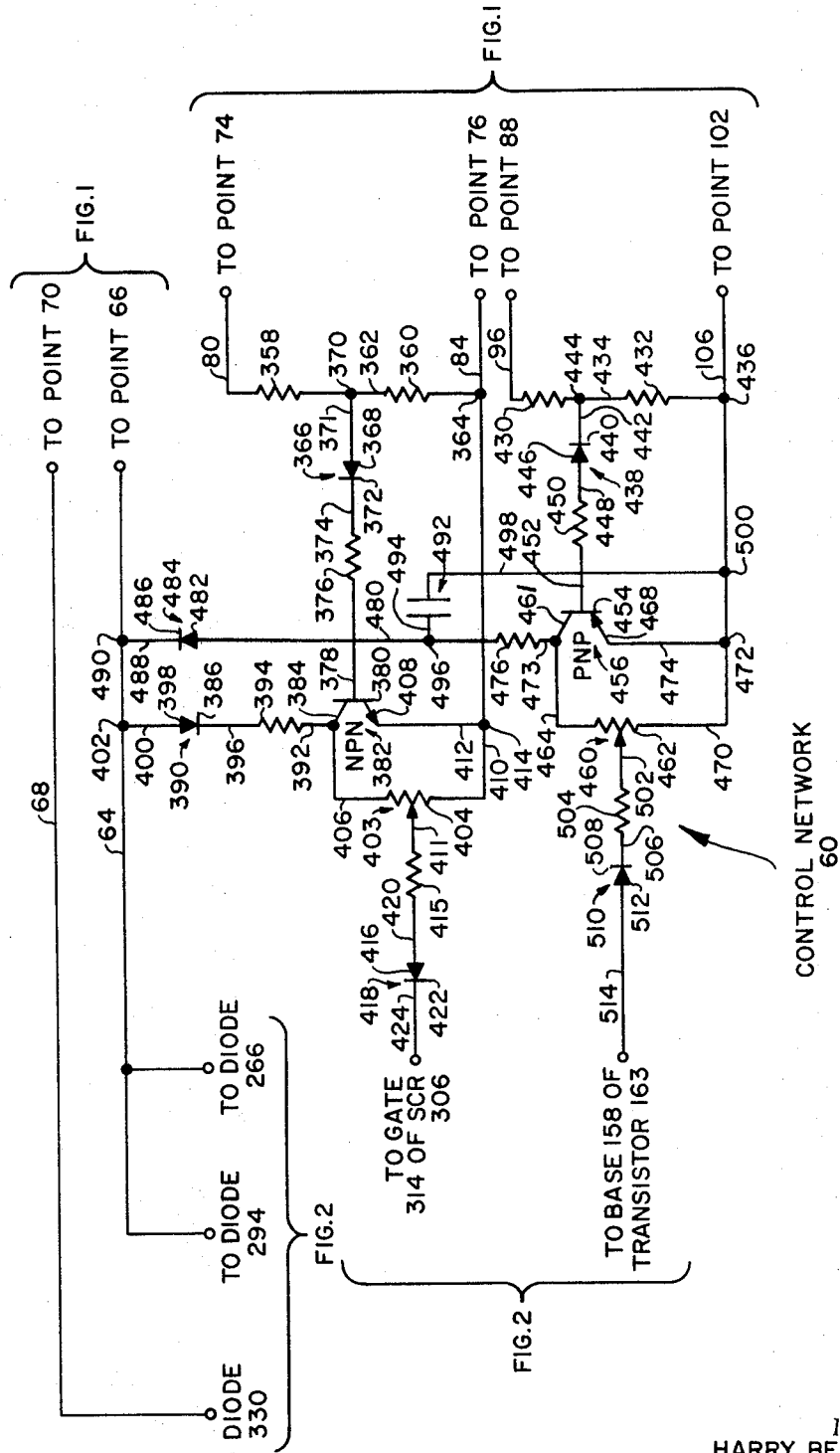
FIG. 3 is an electrical schematic diagram of another part of the control network of FIG. 1 showing a low current and voltage and operating abnormality control system embodying the present invention and applicable to the control system of FIG. 2.

The control network 60 shown generally in FIG. 1 is shown diagrammatically in substantial detail in FIGS. 2 and 3 in which that part of the network 60 which effects high voltage and current control is shown in diagrammatically in FIG. 2 while that part of the control network 60 which effects low voltage and current control is shown diagrammatically in FIG. 3 as applicable to that part of the control network 60 of FIG. 2.

Thus the conductor 80 which leads from the point 74 on the output conductor 37 of the regulator 35 as shown in FIG. 1, is connected, as shown diagrammatically in FIG. 2, to an anode 150 of a filtering diode 152, and which diode 152 has a cathode 154 connected through a conductor 156 to a base 158 of an NPN type transistor 163 having an emitter 160 and a collector 162.

Further, the conductor 84 which leads from the point 76 on the conductor 43 connected to the sensing resistor 41 in the output of the regulator 35, as shown in FIG. 1, is connected, as shown diagrammatically in FIG. 2, to an anode 164 of a filtering diode 166. The diode 166 has a cathode 168 connected to the base 158 of the transistor 163 through a conductor 170 and a conductor 172 joining the conductor 170 at a point 174 and joining at a point 176 the conductor 156 leading to the base 158 of the transistor 163.

The conductor 96 which leads from the point 88 on the output conductor 53 of the regulator 51, as shown in FIG. 1, is further connected, as shown by FIG. 2, to a cathode 180 of a filtering diode 182, and which diode 182 has an anode 184 connected through a conductor 186 to the conductor 172 at the point 174, and through the conductor 172 to the conductor 156 leading to the base 158 of the transistor 163.

Furthermore, the conductor 106 which leads from the point 102 on the conductor 59 connected to the sensing resistor 57 in the output of the regulator 51, as shown in FIG. 1, is connected, as shown by FIG. 2, to a cathode 190 of a filtering diode 192, and which diode 192 has an anode 194 connected through a conductor 195 to a point 200 on a conductor 196. The conductor 196 has connected at a point 174 the conductor 172 which leads therefrom to the conductor 156 and therethrough to the base 158 of the transistor 163.

The negative output at the output conductor 132 of the condition sensor 130, shown in FIG. 1, is applied through resistor 136 and a conductor 140 to a cathode 202 of a filtering diode 204, as shown by FIG. 2. The diode 204 has an anode 206 connected through a conductor 208 to a point 210 on the conductor 196. The positive output at the conductor 134 of the condition sensor 130, shown in FIG. 1, is applied through resistor 142 and conductor 144 to an anode 212 of a filtering diode 214, as shown by FIG. 2. The diode 214 has a cathode 216 connected through a conductor 218 to a point 220 on the conductor 196. The negative and positive outputs at the conductors 132 and 134, respectively, of the condition sensor 130 are applied to the base 158 of the transistor 163 through the conductor 196 and the conductor 172 joining the conductor 196 at the point 174 and therefrom to the conductor 156 leading to the base 158 of the transistor 163.

The diodes 152, 166, 182, 192, 204, and 214 filter any saw tooth or ripple voltages which may be generated in the regulators 35 and 51 and the condition sensor 130, respectively.

A capacitor 222 has one plate connected to the conductor 172 at a point 224 and another plate connected to a grounded conductor 226. The capacitor 222 acts in cooperation with the resistors 79, 82, 94, 104, 136 and 142, shown in FIG. 1, to further filter the outputs of the regulators 35 and 51 and the condition sensor 130 so as to provide constant direct current outputs at the base 158 of the transistors 158.

The emitter 160 of the transistor 163 is connected to a ground conductor 230 through a conductor 232 leading from the emitter 160 and joining the grounded conductor 230 at a point 234. A conductor 236 is connected at the point 220 to the conductor 196 leading to the base 158 of the transistor 163 and the conductor 236 in turn leads to one end of a resistor 238, which resistor 238 is connected at its opposite end through a conductor 240 and a conductor 244 joining the conductor 240 at a point 242 to the grounded conductor 230 at the point 234. A capacitor 245 is connected across the resistor 238 to control operation of a silicon controlled rectifier 306, and is hereinafter explained.

A switch 246 is connected across the conductors 232 and 236 through a conductor 248 joining the conductor 232 at a point 250 and a conductor 252 joining the conductor 236 at a point 254. The switch 246 may be selectively operated to close a circuit across the resistor 238 and capacitor 245 to render the controlling operation thereof ineffective for a purpose to be explained.

The conductor 64 leading from the point 66 on the conductor 50, shown in FIG. 1, is connected, as shown in FIG. 2, through a conductor 260 joining the conductor 64 at a point 262 to an anode 264 of a rectifying diode 266 and which diode 266 has a cathode 268. The cathode 268 of the diode 266 is connected to the collector 162 of the transistor 163 through a conductor 270, a resistor 272 and a conductor 274 joining the collector 162 at a point 276. A resistor 278 is connected across the base 158 and the collector 162 of the transistor 163 through a conductor 280 joining the conductor 270 leading to the collector 162 at a point 282 and a conductor 290 joining the conductor 156 leading to the base 158 at the point 176. Resistor 278 functions to maintain transistor 163 in a conductive state until transistor 163 is rendered nonconductive by a negative voltage at its base 158 which overcomes the positive voltage provided by the diode 266 and the resistor 278. The sensing resistor 57 in the output of the regulator 51, shown in FIG. 1, develops this negative voltage proportional to current for the negative power supply, as will be hereinafter more fully explained.

The conductor 64 is also connected to an anode 292 of a diode 294 and which diode 294 has a cathode 296 connected through a conductor 298, a limiting resistor 300 and a conductor 302 to an anode 304 of a silicon controlled rectifier 306. The diode 294 is a rectifying diode and supplies direct current to the silicon controlled rectifier 306. The silicon controlled rectifier 306 has a cathode 308 connected to ground through a conductor 310 leading from the cathode 308 and joining the conductor 244 at a point 312.

The silicon controlled rectifier 306 has a gate element 314 connected to the collector 162 of the transistor 163 through a conductor 316 leading from the gate 314, a resistor 318 and a conductor 320 joining the collector 162 at the point 276. The gate 314 of the silicon controlled rectifier 306 is connected to ground through the resistor 238 and the capacitor 245 which has one plate connected to the gate 314 through a conductor 324 joining the conductor 316 at a point 326 and its other plate connected through a conductor 328 to the grounded conductor 230 at the point 234.

Silicon controlled rectifier 306 will fire when there is enough positive voltage developed across the agte 314 thereof to ground. The gate 314 is connected to the resistor 238 through the conductor 324 leading from the gate 314 and joining at point 233 the conductor 236 leading to the resistor 238. Resistor 238 together with the capacitor 245 controls the voltage developed across the gate 314 of silicon controlled rectifier 306 to ground.

Sensing resistor 41 in the output of the regulator 35, shown in FIG. 1, develops this positive voltage proportional to current for the positive power supply as will be hereinafter more fully explained.

The conductor 68 leading from the point 70 on the conductor 72, as shown in FIG. 1, is connected, as shown by FIG. 2, to an anode 330 of a diode 332 and which diode 332 has a cathode 334 connected through a conductor 336, a resistor 338 and a conductor 340 to a collector 342 of an NPN type transistor 343. The diode 332 is a rectifying diode and supplies direct current for the transistor 343. The transistor 343 has an emitter 344 connected to the conductor 244, which conductor 244 joins the grounded conductor 230 at the point 234. The transistor 343 has a base 346 which is connected through a conductor 348, an isolating resistor 350 and a conductor 352 to the conductor 302 leading to the anode 304 of the silicon controlled rectifier 306 at a point 354. Silicon controlled rectifier 306 when fired renders transistor 343 cut off which in turn controls silicon controlled rectifiers 28 and 40 through controllers 11 and 54 shown in FIG. 1 for removing all power to the system as heretofore noted.

In summation, the control network 60 is energized by the output from the alternating current source 3, shown in FIG. 1, and applied through the conductor 64, and is responsive to the outputs from the regulators 35 and 51 and the condition sensor 130 applied through the conductors 80 and 84, 96 and 106, 132 and 134, respectively, so as to provide through the operation of the silicon controlled rectifier 306 and transistor 343 a controlling output at the output conductor 68. The controlling output is effective through the controllers 11 and 54, as shown by FIG. 11, for controlling the silicon controlled rectifiers 28 and 40 whereby all power to the system is turned off in the event of a high current or high voltage malfunction in the regulators 35 and 51 or an operating condition abnormality as sensed by the condition sensor 130.

After the firing of the silicon controlled rectifier 306 and in order to recondition the controller 60 for subsequent further operation, the switch 246 may be closed by the operator so as to short the controlling resistor 238 and capacitor 245 and the control gate 314 of the rectifier 306 to ground and thereby discharge the positive firing potential applied thereto.

LOW VOLTAGE AND CURRENT CONTROL

With reference to FIG. 3, there is shown additional circuitry wherein the control network 60 is rendered effective by low voltage and low current outputs from the regulators 35 and 51, shown in FIG. 1, for providing the controlling output at the output conductor 68 whereby all power to the system is turned off.

A voltage divider is connected across the conductors 80 and 84, which conductors 80 and 84 lead to the points 74 and 76 on the conductors 37 and 43 in the output of the regulator 35, as shown in FIG. 1. The voltage divider includes a resistor 358 connected at one end to the conductor 80 and at an opposite end through a conductor 362 to one end of a resistor 360. The resistor 360 is in turn connected at an opposite end to the conductor 84 at a point 364 so as to return the voltage divider through resistor 82 and conductor 81 to the sensing resistor 41 in the output of the regulator 35, as shown in FIG. 1.

A diode 366 has an anode 368 connected through a conductor 371 to a point 370 on the conductor 362. The diode 366 has a cathode 372 connected through a conductor 374, a resistor 376 and a conductor 378 to a base 380 of an NPN type tranistor 382. Diode 366 and resistor 376 cooperate to suppress any tendency for oscillations in the circuit.

The transistor 382 has a collector 384 connected to a cathode 386 of a rectifying diode 390 through a conductor 392, a collector resistor 394 and a conductor 396. The diode 390 and an anode 398 connected through a conductor 400 to a point 402 on the conductor 64, as shown generally in FIG. 2 and diagrammatically in detail by FIG. 3, and which conductor 64, as shown in FIG. 1, joins at the point 66 the conductor 50 leading from the alternating current source 3. The conductor 64, as shown in FIG. 3, further leads to the diodes 266 and 294 and the conductor 68 leads to the diode 330, as shown generally in FIG. 3, and diagrammatically in detail by FIG. 2.

A potentiometer 403, as shown in FIG. 3, has a resistance element 404 connected at one end to the collector 384 of the transistor 382 through the conductor 406 while an opposite end of the resistance element 404 is connected to an emitter 408 of the transistor 382 through a conductor 410 and a conductor 412 leading from the emitter 408 and joining the conductor 410 at a point 414. The conductor 84 leading from the point 76 on conductor 43, as shown in FIG. 1, is connected, as shown in FIG. 3, to the conductors 410 and 412 at the point 414.

The potentiometer 403 functions as a voltage divider between collector 384 of transistor 382 and ground to provide a positive voltage at the collector 384 great enough to normally maintain NPN type transistor 382 conductive when the voltage applied to the base 380 is above a predetermined limit. However upon this voltage being decreased below this limit, the transistor 382 becomes nonconductive, as hereinafter explained. The positive voltage is effected by an operator-operative adjustable arm 411 operatively positioned in relation to the resistance element 404 to effect the foregoing operation. The arm 411 is connected through an isolating resistor 415 and a conductor 420 to an anode 416 of a rectifying diode 418. The diode 418 which rectifies any alternating current build up in the circuit has a cathode 422 which is connected through a conductor 424 to the control gate 314 of the silicon control rectifier 306, such as shown in FIG. 2, wherein the conductor 424 leads from the cathode 422 and joins at a point 321 the conductor 320 and leads therefrom through the resistor 318 and the conductor 316 to the gate 314.

A second voltage divider, as shown in FIG. 3, is connected across the conductors 96 and 106, which conductors 96 and 106 lead to the points 88 and 102 on the conductors 53 and 59 in the output of the regulator 51, as shown in FIG. 1. The second voltage divider includes a resistor 430 connected at one end to the conductor 96 and at an opposite end through a conductor 434 to one end of a resistor 432. The resistor 432 is connected at an opposite end to the conductor 106 at a point 436 so as to return the voltage divider through resistor 104 and conductor 100 to the sensing resistor 57 in the output of the regulator 51, as shown in FIG. 1.

A diode 438 has a cathode 440 connected by a conductor 442 to a point 444 on the conductor 434 and has an anode 446 connected through a conductor 448, a resistor 450 and a conductor 452 to a base 454 of a PNP type transistor 456. Diode 438 and resistor 450 function to suppress any tendency for oscillations in the circuit.

A second potentiometer 460 has a resistance element 462 connected at one end to a collector 461 of the transistor 456 through a conductor 464 while an opposite end of the resistor 462 is connected to an emitter 468 of the transistor 456 through a conductor 470 joining at a point 472 a conductor 474 leading from the emitter 468. The conductor 106 leading from the point 102 on conductor 59, as shown in FIG. 1, is connected to the conductors 470 and 474 at the point 472, as shown by FIG. 3.

The collector 461 of the transistor 456 is further connected through a conductor 473, a resistor 476 and a conductor 480 to an anode 482 of a rectifying diode 484 and which diode 484 has a cathode 486 connected through a conductor 488 to a point 490 on the conductor 64 as shown generally in FIG. 2 and diagrammatically in detail by FIG. 3, and which conductor 64 as shown in FIG. 1 joins at the point 66 the conductor 50 leading from the alternating current source 3. The diode 484 supplies a negative direct current to the collector 460 of the transistor 456.

A capacitor 492 has one plate connected through a conductor 494 to the conductor 480 at a point 496 on the conductor 480 and has another plate connected through a conductor 498 to a point 500 on the conductor 106.

The potentiometer 460 has an adjustable arm 502 operatively positioned in cooperative relation with resistor 462 so as to effect a negative voltage at the collector 460 great enough to normally maintain the PNP type transistor 456 conductive when the voltage applied to the base 454 is below a predetermined limit. However upon this voltage being increased above this predetermined limit the transistor 456 becomes non-conductive, as hereinafter explained. The adjustable arm 502 is connected through an isolating resistor 504 and a conductor 506 to a cathode 508 of a diode 510. The diode 510 has an anode 512 which is connected through a conductor 514 to the base 158 of a transistor 163, such as shown in FIG. 2, wherein the conductor 514 leads from the anode 512 and joins at a point 221 the conductor 156 leading to the base 158. The diode 510 and the resistor 504 cooperate in providing a pure direct current at the base 158 of transistor 163.

OPERATION

Controller 11 shown in FIG. 1 controls silicon controlled rectifier 30 which in turn controls the output of the regulator 35 in the positive power supply from zero to full output. The controller 11 is controlled by the transistor 343 in the control network 60, which control network 60 may effect high voltage and current control, as explained with reference to FIG. 2 or low voltage and current control, as explained with reference to FIG. 3. Transistor 343 is biased by a positive direct current from diode 332. The regulator 35 is of a type so arranged that when transistor 343 is rendered conductive full output is obtained from regulator 35 and when transistor 343 is rendered nonconductive no output is obtained from regulator 35.

Silicon controlled rectifier 306 receives a positive pulsating direct current directly from alternating current source 3 so that when it is rendered nonconductive it will remain in this state and when it is rendered conductive it grounds the base 346 of the transistor 343, thus rendering transistor 343 nonconductive which in turn renders, through controller 11, silicon controlled rectifier 30 nonconductive. Transistor 163 controls the firing of silicon controlled rectifier 306 and is biased by a positive pulsating direct current directly from alternating current source 3.

HIGH VOLTAGE AND CURRENT CONTROL

The resistor 278 is connected between the base 158 and the collector 162 of the transistor 163 to maintain transistor 163 normally conductive. However when a negative voltage from the sensing resistor 57 in the output of the regulator 51, as shown by FIG. 1, is applied through conductor 106 and diode 192, as shown by FIG. 2, the transistor 163 is rendered nonconductive. This condition occurs when the output of the regulator 51 through the current to voltage sensing resistor 57, as shown in FIG. 1, exceeds a predetermined negative value. When transistor 163 is thus rendered nonconductive a sufficient positive voltage is applied to the gate 314 of the silicon controlled rectifier 306 to cause the silicon controlled rectifier 306 to fire which in turn renders transistor 343 nonconductive to turn off, through the controllers 11 and 54, all power to the system.

A positive voltage developed by the current to voltage sensing resistor 41 in the output of the regulator 35 in excess of a predetermined limit and applied through the diode 166 to the gate 314 of the silicon controlled rectifier 306 causes the silicon controlled rectifier 306 to fire whereby all power to the system is turned off through the controllers 11 and 54. This completes the high current protection feature of the invention.

To sense high voltage in both the positive and negative power supplies and to turn off power to the system in response to said high voltage, the sensing resistors 41 and 57 in the outputs of the regulators 35 and 51 respectively are bypassed, with said positive and negative voltages exceeding a predetermined amount affecting the transistor 163 and the silicon controlled rectifier 306 to turn off power to the system as heretofore noted.

LOW VOLTAGE AND CURRENT CONTROL

In order to sense low voltage or low current in either the negative or positive power supplies it is necessary to add the NPN transistor 382 and the PNP transistor 456 as shown in FIG. 3. The transistors 382 and 456 are conductive when there is full voltage from the positive and negative power supplies, respectively. The full voltage from the positive power supply acting through the voltage divider including resistors 358 and 360 maintains the NPN transistor 382 conductive, and the full voltage from the negative power supply acting through the voltage divider including the resistors 430 and 432 maintains the PNP transistor 456 conductive.

The output at the collector 384 of transistor 382 applied through the isolating resistor 415 to the gate 314 of the silicon controlled rectifier 306 keeps the silicon controlled rectifier 306 from firing. When voltage from the positive supply is below a predetermined value, transistor 382 is rendered nonconductive which in turn fires the silicon controlled rectifier 306 to turn off both power supplies through the transistor 343 as heretofore noted.

When transistor 456 is conductive, the output therefrom applied to the base 158 of transistor 163 maintains transistor 163 conductive. When the negative voltage from the negative power supply falls below a predetermined limit, transistor 456 is rendered nonconductive which in turn renders transistor 163 nonconductive to fire silicon controlled rectifier 306 and to turn off both positive and negative power supplies through the transistor 343.

The resistors 358 and 360 in the voltage divider across the positive power supply are connected to include the voltage developed across the current to sensing resistor 41 in the output of the regulator 35 so that if either a low voltage or low current malfunction occurs both positive and negative power supplies are turned off.

Thus, if the output voltage from the regulator 35 is lowered by a predetermined amount or if the current developed by the sensing resistor 41 drops below a predetermined amount both positive and negative power supplies will be shut off. The same result is provided by the negative power supply through the current to voltage sensing resistor 57 in the output of the regulator 51 so that if either the ouput voltage or the current or both is lowered by a predetermined amount both positive and negative power supplies will be shut off. This completes the low current and low voltage protection feature of the invention.

With further reference to FIG. 2, it is to be noted that positive and negative voltages from the condition sensor 130 are also applied to the control network 60. These positive and negative voltages may correspond to a predetermined sensed condition such as high and low temperature and affect the transistor 163 and the silicon controlled rectifier 306 to turn off power to the system when said positive and negative voltages exceed predetermined limits as heretofore noted.

In summation, power to the system is turned off when transistor 343 is rendered nonconductive. This is achieved by firing silicon controlled rectifier 306 through either a high positive output from regulator 35 or a high negative output from regulator 51, which high negative output renders transistor 163 nonconductive for applying to silicon controlled rectifier 306 a positive output sufficient to fire silicon controlled rectifier 306. Silicon controlled rectifier 306 is also fired in response to low outputs from the regulators 35 and 51. A low positive output from the regulator 35 renders transistor 382 nonconductive for applying a sufficient positive firing voltage to the silicon controlled rectifier 306. Alternately, a low negative output from the regulator 51 renders the transistor 456 nonconductive which in turn renders the transistor 163 nonconductive for applying a sufficient firing voltage to positive silicon controlled rectifier 306.

Thus, the positive output for firing the silicon controlled rectifier 306, which in turn renders the transistor 343 nonconductive for turning off all power to the system, is provided by either the regulator 35, the nonconductive transistor 163 in response to a high negative output from the regulator 51, the nonconductive transistor 163 which is rendered nonconductive by the nonconductive transistor 456 in response to a low negative output from the regulator 51, or the transistor 382 in response to a low positive output from the regulator 35.

In this connection it is to be noted that when the positive output from the regulator 35 is below the predetermined limit, the silicon controlled rectifier 306 will be nonconductive, and if there then occurs a high negative output from the regulator 51 the silicon controlled rectifier 306, although unaffected by the output from the regulator 35, will be rendered conductive by the negative output from the regulator 51 rendering the transistor 163 nonconductive so as to apply a positive output to the gate 314 to fire the silicon controlled rectifier 306. If both the high positive output and the low negative output from the regulators 35 and 51, respectively, are below their respective limits so as not to affect the silicon controlled rectifier 306, and if there then occurs a low positive output from the regulator 35 or a low negative output from the regulator 51, the silicon controlled rectifier 306 will be rendered conductive by the low positive output from the regulator 35 which affects the transistor 382 to apply through conductor 424 a positive output to the gate 314 to fire the silicon controlled rectifier 306, or by the low negative output from the regulator 51 which affects the transistor 456 to apply through conductive 514 a negative output to render the transistor 163 nonconductive so as to apply a positive output to the gate 314 to fire the silicon controlled rectifier 306.

When the power supplies have been shut off for any of the aforenoted malfunctions, the system may be reset by closing switch 246 which shorts out capacitor 322 rendering silicon controlled rectifier 306 nonconductive. Transistor 343 is rendered conductive and remains in this state, if the malfunction has been removed, and thus returns power to the system.

Although only one embodiment of the invention has been illustrated and described, various changes in the form and relative arrangements of the parts, which will now appear to those skilled in the art may be made without departing from the scope of the invention.

What is claimed is:

1. In an electrical system including a power supply and means for regulating the output from said power supply, a control network comprising:
   first means connected to the power supply and responsive to current and voltage below predetermined levels in one sense therefrom for providing a first controlling output;
   second means connected to the power supply and responsive to current and voltage below predetermined levels in an opposite sense therefrom for providing a second controlling output;
   third means connected to the first and second means and responsive to one of the first and second controlling outputs for providing a third controlling output; and
   the regulating means being operably connected to the third means and responsive to the third controlling output to turn off the power supply.

2. Apparatus as described by claim 1, wherein the third means comprises:
   fourth means connected to the second means and responsive to the second controlling output therefrom for providing a fourth controlling output, and connected to the power supply and responsive to current and voltage above predetermined levels in the opposite sense therefrom for providing the fourth controlling output;
   fifth means connected to the first means and to the fourth means and responsive to one of the first and fourth controlling outputs for providing a fifth controlling output, and connected to the power supply and responsive to current and voltage above pedetermined levels in the one sense therefrom for providing the fifth controlling output; and
   sixth means connected to the fifth means and responsive to the fifth controlling output therefrom for providing the third controlling output.

3. In an electrical system including a power supply and means for regulating the output of said power supply, a control network for the regulating means comprising:
   first means connected to the power supply and responsive to current and voltage below predetermined levels in one sense therefrom for providing a first controlling output;
   second means connected to the power supply and responsive to current and voltage below pedetermined levels in an opposite sense therefrom for providing a second controlling output;
   third means responsive to a predetermined operating condition of the electrical system for providing a third controlling output when a predetermined limit of said operating condition in one sense is exceeded, and for providing a fourth controlling output when a predetermined limit in an opposite sense is exceeded;
   fourth means connected to the power supply and responsive to current and voltage above predetermined limits in the opposite sense therefrom for providing a fifth controlling output, and connected to the second and third means and responsive to one of the second and fourth controlling outputs for providing the fifth controlling output;
   fifth means connected to the power supply and responsive to current and voltage above predetermined limits in the one sense therefrom for providing a sixth controlling output, and connected to the first, third and fourth means and responsive to one of the first, third and fifth controlling outputs for providing the sixth controlling output;
   the regulator connected to the fifth means and responsive to the sixth controlling output for turning off the power supply.

References Cited

UNITED STATES PATENTS

| 3,225,257 | 12/1965 | Fegley | 317—33 |
| 3,229,164 | 1/1966 | McCartney et al. | 317—33 X |
| 3,240,997 | 3/1966 | Burgi et al. | 317—33 |

JAMES D. TRAMMELL, Primary Examiner

U.S. Cl. X.R.

317—33; 321—14